US009549093B2

(12) United States Patent
Tanaka et al.

(10) Patent No.: US 9,549,093 B2
(45) Date of Patent: Jan. 17, 2017

(54) LIGHT GUIDING DEVICE USES IN IMAGE READING DEVICE PERFORMING LIGHT DISTRIBUTION WITH IMPROVED RATIO OF LIGHT QUANTITY

(71) Applicant: Konica Minolta, Inc., Chiyoda-ku, Tokyo (JP)

(72) Inventors: Satoko Tanaka, Toyokawa (JP); Masahiko Tanaka, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/573,318

(22) Filed: Dec. 17, 2014

(65) Prior Publication Data
US 2015/0181070 A1 Jun. 25, 2015

(30) Foreign Application Priority Data
Dec. 25, 2013 (JP) .................................. 2013-267287

(51) Int. Cl.
*H04N 1/193* (2006.01)
*H04N 1/028* (2006.01)
*F21V 8/00* (2006.01)

(52) U.S. Cl.
CPC .......... *H04N 1/02835* (2013.01); *G02B 6/001* (2013.01)

(58) Field of Classification Search
CPC .. H04N 1/02835; G02B 6/0016; G02B 6/0018
See application file for complete search history.

(56) References Cited

U.S. PATENT DOCUMENTS

| 2009/0015883 | A1* | 1/2009 | Kim | .................. | H04N 1/02835 |
| | | | | | 358/475 |
| 2009/0109683 | A1* | 4/2009 | Miyashita | .............. | G02B 5/045 |
| | | | | | 362/297 |
| 2011/0273751 | A1* | 11/2011 | Wilsher | ............... | G02B 6/0006 |
| | | | | | 358/475 |
| 2012/0307319 | A1 | 12/2012 | Higashitani | | |

FOREIGN PATENT DOCUMENTS

| JP | H10112783 | A | 4/1998 |
| JP | 2001-202815 | | 7/2001 |
| JP | 2006155964 | A | 6/2006 |
| JP | 2009022007 | A | 1/2009 |
| JP | 2012-248489 | A | 12/2012 |

OTHER PUBLICATIONS

Japanese Notification of Reasons for Rejection corresponding to Patent Application No. 2013-267287; Dispatch Date: Dec. 15, 2015, with English translation.

* cited by examiner

*Primary Examiner* — Benny Q Tieu
*Assistant Examiner* — Haris Sabah
(74) *Attorney, Agent, or Firm* — Cantor Colburn LLP

(57) ABSTRACT

A light guide for use in an image reading apparatus. The light guide extends in a predetermined direction and includes: a reflecting surface being parallel to the predetermined direction; an emitting surface; and a prism configured to reflect light to the emitting surface. The prism includes a plurality of asperities formed on the reflecting surface. When viewed from a first direction orthogonal to the reflecting surface, at least one of the plurality of asperities includes a portion parallel to a predetermined curve or a predetermined straight line inclined from a second direction orthogonal to the predetermined direction.

10 Claims, 13 Drawing Sheets

F I G . 1
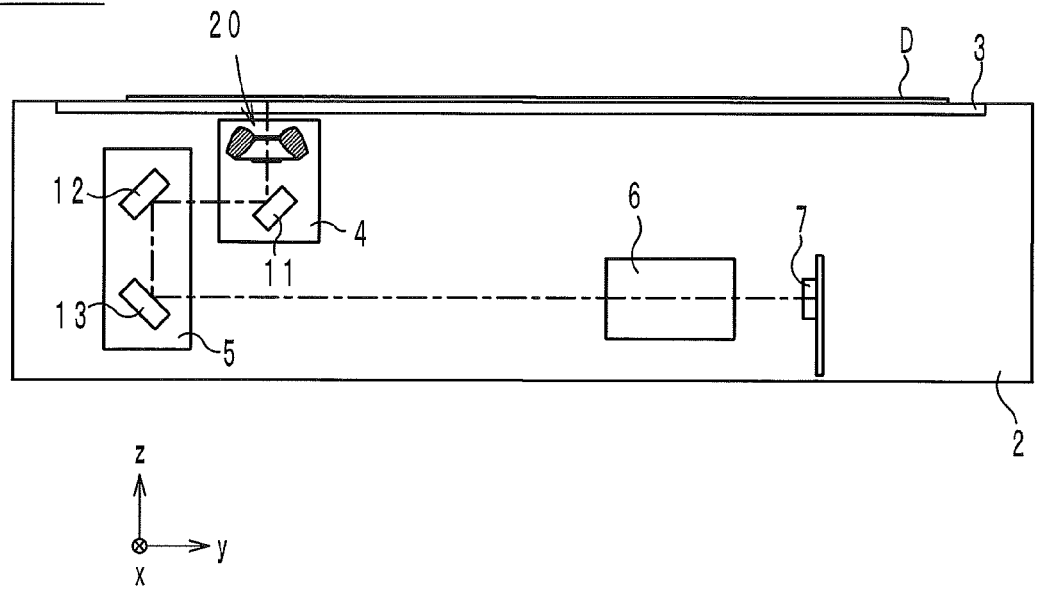
F I G . 2
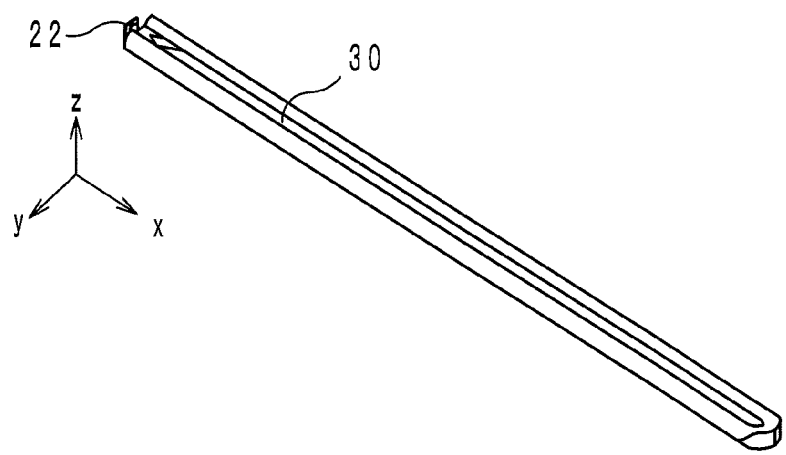

FIG. 11
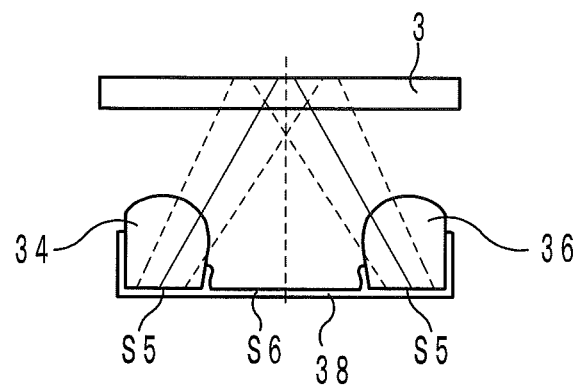
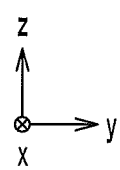
FIG. 12
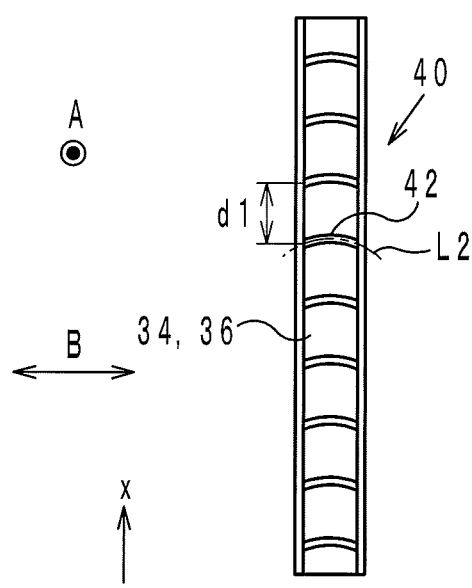

F I G . 1 9
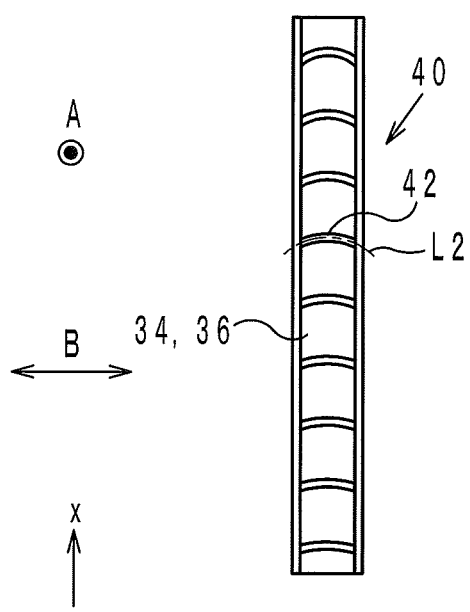

F I G . 2 2
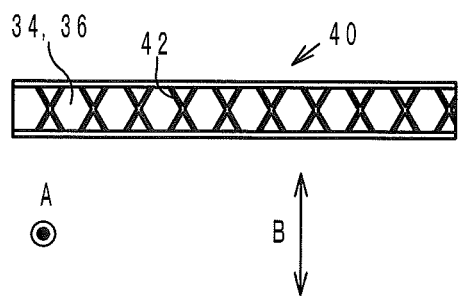
F I G . 2 3
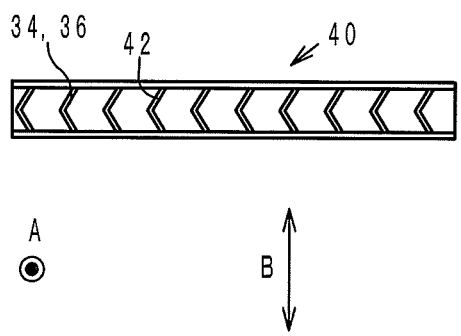
F I G . 2 4
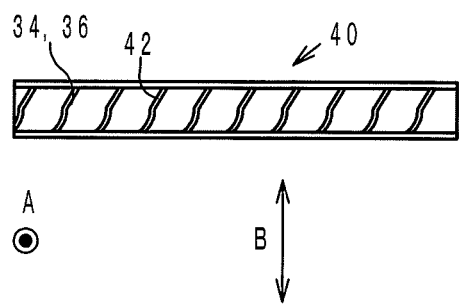

LIGHT GUIDING DEVICE USES IN IMAGE READING DEVICE PERFORMING LIGHT DISTRIBUTION WITH IMPROVED RATIO OF LIGHT QUANTITY

The present invention claims benefit of priority to Japanese Patent Application No. 2013-267287 filed Dec. 25, 2013, the entire content of which is incorporated herein by reference.

BACKGROUND

1. Technical Field

The present invention relates to a light guide, a light guiding device and an image reading apparatus, and more particularly to an image reading apparatus configured to optically read an image of a document, and a light guide and a light guiding device preferably for use in the image reading apparatus.

2. Description of Related Art

In an image reading apparatus called a scanner, generally, either a reading system including an illumination unit extending in a main-scanning direction or an object, such as a document, to be subjected to image reading is moved in a sub-scanning direction, so that the image of the document can be read two-dimensionally. As a light source for the image reading, a fluorescent lamp is conventionally used. In recent years, however, replacement of the fluorescent lamp with an LED is accelerated. Unlike a fluorescent lamp, an LED is a point light source. Therefore, when an LED is used as a light source in an image reading apparatus, normally, a light guide as disclosed by Japanese Patent Laid-Open Publication No. 2012-248489 is also used so as to achieve linear light distribution needed for scanning. Such a light guide reflects light input from the LED on a prism provided therein so as to illuminate an object to be read. With respect to such a light guide, an improvement in the ratio of the quantity of light emitted from the light guide for illumination of the object to be read to the quantity of light input to the light guide (i.e., the light use efficiency) with maintenance of good light distribution is demanded.

SUMMARY

An object of the present invention is to provide a light guide, a light guiding device and an image reading apparatus having an improved light use efficiency while maintaining good light distribution.

A light guide according to a first aspect of the present invention is preferably for use in an image reading apparatus, and the light guide extends in a predetermined direction. The light guide comprises: a reflecting surface being parallel to the predetermined direction; an emitting surface; and a prism configured to reflect light to the emitting surface, the prism comprising a plurality of asperities formed on the reflecting surface. When viewed from a first direction orthogonal to the reflecting surface, at least one of the plurality of asperities includes a portion parallel to a predetermined curve or a predetermined straight line inclined from a second direction orthogonal to the predetermined direction.

A light guiding device according to a second aspect of the present invention comprises: a plurality of light guides as described above; and a beam splitter having a splitting surface configured to total-reflect incident light so as to direct the light into the plurality of light guides. When each of the light guides is viewed from the first direction, the predetermined straight line is substantially parallel to a direction orthogonal to the splitting surface.

A light guiding device according to a third aspect of the present invention comprises: a plurality of light guides as described above; and a beam splitter having a splitting surface configured to total-reflect incident light so as to direct the light into the plurality of light guides. When each of the light guides is viewed from the first direction, an angle of the predetermined straight line parallel to a first asperity of the plurality of asperities to the second direction is equal to or smaller than an angle of the predetermined straight line parallel to a second asperity of the plurality of asperities to the second direction, the second asperity being adjacent to the first asperity and being farther from a light entrance portion of the light guide than the first asperity.

A light guiding device according to a fourth aspect of the present invention comprises: a plurality of light guides as described above; and a beam splitter having a splitting surface configured to total-reflect incident light so as to direct the light into the plurality of light guides. When each of the light guides is viewed from the first direction, a curvature of the predetermined curve parallel to a third asperity of the plurality of asperities is equal to or smaller than a curvature of the predetermined curve parallel to a fourth asperity of the plurality of asperities, the fourth asperity being adjacent to the third asperity and being farther from a light entrance portion of the light guide than the third asperity.

A light guiding device according to a fifth aspect of the present invention comprises: a plurality of light guides as described above; and a beam splitter having a splitting surface configured to total-reflect incident light so as to direct the light into the plurality of light guides. When each of the light guides is viewed from the first direction, an angle of the predetermined straight line parallel to one of the asperities located in a first area to the second direction is different from an angle of the predetermined straight line parallel to another of the asperities located in a second area to the second direction, the first area and the second area bordering each other at a point closest to the beam splitter on a line of intersection between a plane on which the splitting surface is located and the reflecting surface.

A light guiding device according to a sixth aspect of the present invention comprises: a plurality of light guides as described above; and a beam splitter having a splitting surface configured to total-reflect incident light so as to direct the light into the plurality of light guides. When each of the light guides is viewed from the first direction, a curvature of the predetermined curve parallel to one of the asperities located in a third area is different from a curvature of the predetermined curve parallel to another of the asperities located in a fourth area, the third area and the fourth area bordering each other at a point closest to the beam splitter on a line of intersection between a plane on which the splitting surface is located and the reflecting surface.

A light guiding device according to a seventh aspect of the present invention comprises: the light guide as described above; and a base sustaining the light guide by directly supporting an outer surface of the reflecting surface of the light guide. The outer surface is parallel to a document mount surface of an image reading apparatus in which the light guide is to be employed.

An image reading apparatus according to an eighth aspect of the present invention comprises the light guide described above.

An image reading apparatus according to a ninth aspect of the present invention comprises a light source device including the light guide described above and an LED light source.

An image reading apparatus according to a tenth aspect of the present invention comprises a light source device including the light guiding device described above and an LED light source.

BRIEF DESCRIPTION OF THE DRAWINGS

FIG. 1 is a configuration diagram of the inside of an image reading apparatus according to an embodiment of the present invention.

FIG. 2 is a perspective view of a light source device according to an embodiment of the present invention.

FIG. 11 is a sectional view of the light guiding device and the document glass along the line T-T indicated in FIG. 3, a base supporting the light guiding device having another shape.

FIG. 12 is a plan view of a light guide according to a first modification when viewed from a direction orthogonal to a reflecting surface.

FIG. 19 is a plan view of a light guide according to a fifth modification when viewed from a direction orthogonal to a reflecting surface.

FIG. 22 is a plan view of a light guide according to another modification when viewed from a direction orthogonal to a reflecting surface.

FIG. 23 is a plan view of a light guide according to another modification when viewed from a direction orthogonal to a reflecting surface.

FIG. 24 is a plan view of a light guide according to another modification when viewed from a direction orthogonal to a reflecting surface.

DETAILED DESCRIPTION OF THE PREFERRED EMBODIMENTS

Figure 3:
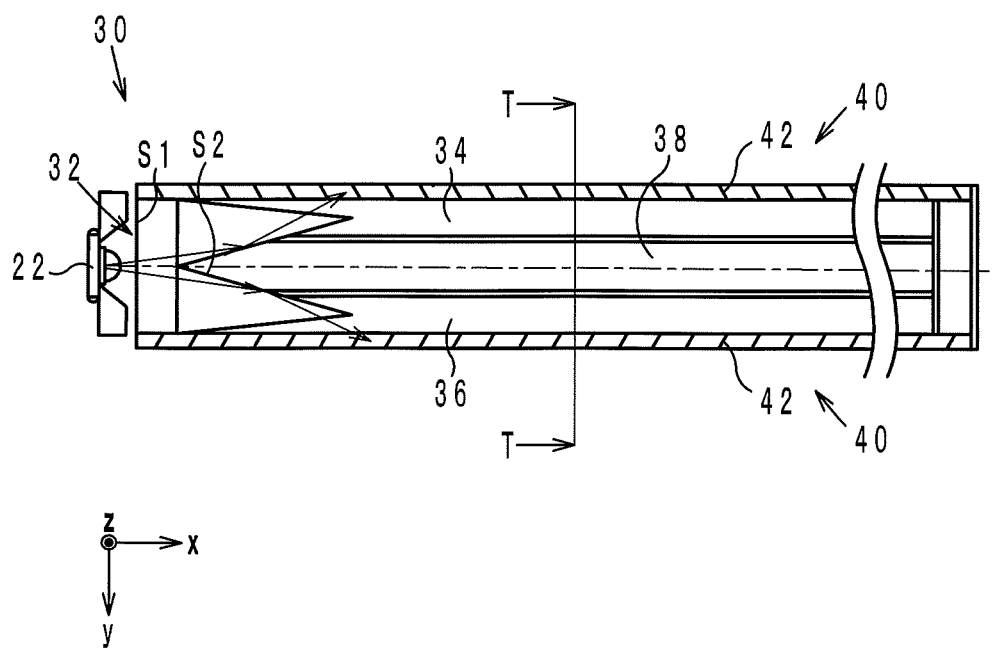
FIG. 3 is a plan view of the light source device when viewed from a direction orthogonal to a mount surface of a document glass.

A light guide, a light guiding device and an image reading apparatus according to an embodiment of the present invention are hereinafter described with reference to the drawings.

Structure of Image Reading Apparatus; See FIG. 1

FIG. 1 is a configuration diagram of an image reading apparatus 1 according to an embodiment of the present invention. In the following, the main-scanning direction of the image reading apparatus 1 is defined as x-direction. The sub-scanning direction of the image reading apparatus 1 is defined as y-direction. The vertical direction of the image reading apparatus 1 is defined as z-direction. The upstream sub-scanning direction is a negative y-direction, and the upstream main-scanning direction is a negative x-direction.

As seen in FIG. 1, the image reading apparatus 1 comprises a body 2, a document glass 3, a first slider unit 4, a second slider unit 5, a focusing lens 6, an image pick-up element 7, mirrors 11 through 13, and a light source device 20.

The body 2 is a cuboidal case supporting the document glass 3, the first slider unit 4, the second slider unit 5, the focusing lens 6, the image pick-up element 7, the mirrors 11 through 13, and the light source device 20. The document glass 3 is a transparent rectangular plate fitted in an opening made on the upper surface of the body 2. A document D is placed on a mount surface (i.e., the upper surface) of the document glass 3 with a side to be read down.

The light source device 20 has two light guides inside so as to illuminate the document D in two directions through the document glass 3. The light source device 20 will be described later in more detail.

As seen in FIG. 1, the mirror 11 reflects light reflected from the document D in the negative y-direction. The mirror 12 reflects the light incoming from the mirror 11 in the negative z-direction. The mirror 13 reflects the light incoming from the mirror 12 in the positive y-direction.

The light source device 20 and the mirror 11 are, as seen in FIG. 1, mounted on the first slider unit 4. During image reading of the document D, the first slider unit 4 is moved in the positive y-direction along the lower surface of the document glass 3 at a speed V by a mechanism (not shown), for example, including a motor, a belt, a pulley, etc.

The mirrors 12 and 13 are, as seen in FIG. 1, mounted on the second slider unit 5. During image reading of the document D, the second slider unit 5 is moved in the positive y-direction along the lower surface of the document glass 3 at a speed V/2 by a mechanism (not shown), for example, including a motor, a belt, a pulley, etc. Thereby, the optical path length from the surface of the document D being read to the image pick-up element 7 is kept constant during the movements of the slider units 4 and 5.

The focusing lens 6 focuses light to form optical images on the image pick-up element 7. The image pick-up element 7 is a light-receiving element configured to receive the light reflected from the document D. Specifically, the image pick-up element 7 is a line sensor, such as a CCD camera or the like, having a linear image pick-up area extending in the x-direction, and the image pick-up element 7 receives optical images formed by the focusing lens 7 to scan an image of the document D.

In the image reading apparatus 1 having the structure above, for image reading of the document D, the document D is illuminated by the light source device 20, and light reflected from the document D is reflected by the mirrors 11, 12 and 13 sequentially. The light reflected by the mirror 13 enters the focusing lens 6, and the light is focused on the image pick-up element 7 by the focusing lens 6. The image pick-up element 7 carries out photoelectric conversion pixel by pixel based on the light intensity of each pixel. In this way, the image pick-up element 7 generates image signals (RGB signals) corresponding to the image of the document and outputs the signals to a control unit (not shown).

Structure of Light Source Device; See FIGS. 2-6

As illustrated in FIG. 2, the light source device 20 as a whole is shaped like a stick and extends in the x-direction. The light source device 20 comprises an LED light source 22 and a light guiding device 30.

The LED light source 22 is a white light source located at the end of the light source device 20 in the negative x-direction.

As illustrated in FIG. 3, the light guiding device 30 comprises a beam splitter 32, two light guides 34 and 36, and a base 38.

The beam splitter 32 splits light emitted from the LED light source 22 into two light beams and directs the two light beams into the two light guides 34 and 36 respectively. The beam splitter 32 is made of acrylic, and as seen in FIG. 3, has an entrance surface S1 and a V-shaped splitting surface S2. The shape of V of the splitting surface S2 protrudes in the negative x-direction when viewed from the z-direction. The beam splitter 32 is positioned such that the pointed tip of the V-shaped surface S2 is on the optical axis of the LED light source 22 when viewed from the z-direction. The light emitted from the LED light source 22 enters the light guiding device 30 through the entrance surface S1 and comes to the splitting surface S2. A part of the light coming to the splitting surface S2 is total-reflected by a plane slanting in the negative y-direction of the splitting surface S2 and thereby directed into the light guide 34. The other part of the light coming to the splitting surface S2 is total-reflected by a plane slanting in the positive y-direction of the splitting surface S2 and thereby directed into the light guide 36.

Figure 4:
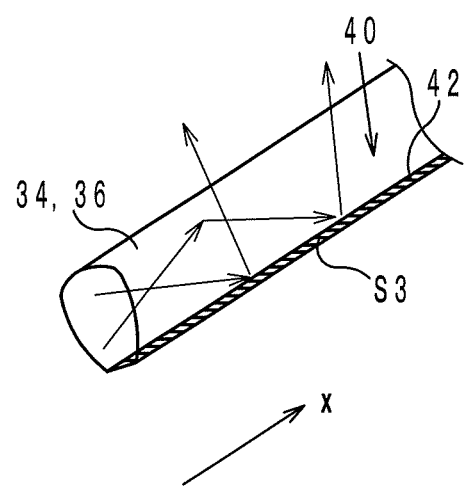
FIG. 4 is a perspective view of a light guide according to an embodiment of the present invention.

The light guide 34 is a rod-like acrylic member extending in the x-direction. As seen in FIG. 4, a cross section of the light guide 34 is like an oval truncated at a lower portion having a greater curvature. On a reflecting surface S3 at the bottom of the light guide 34, asperities 42 are made to form a prism 40. In the light guide 34 having the structure, the light beam directed therein from the beam splitter 32 propagates in the main-scanning direction while being total-reflected repeatedly. Meanwhile, the propagating light beam is partly reflected by the prism 40 provided at the bottom of the light guide 34, and the reflected light is emitted from the light guide 34 toward the document D through an emitting surface located at the top of the light guide 34.

Figure 5:
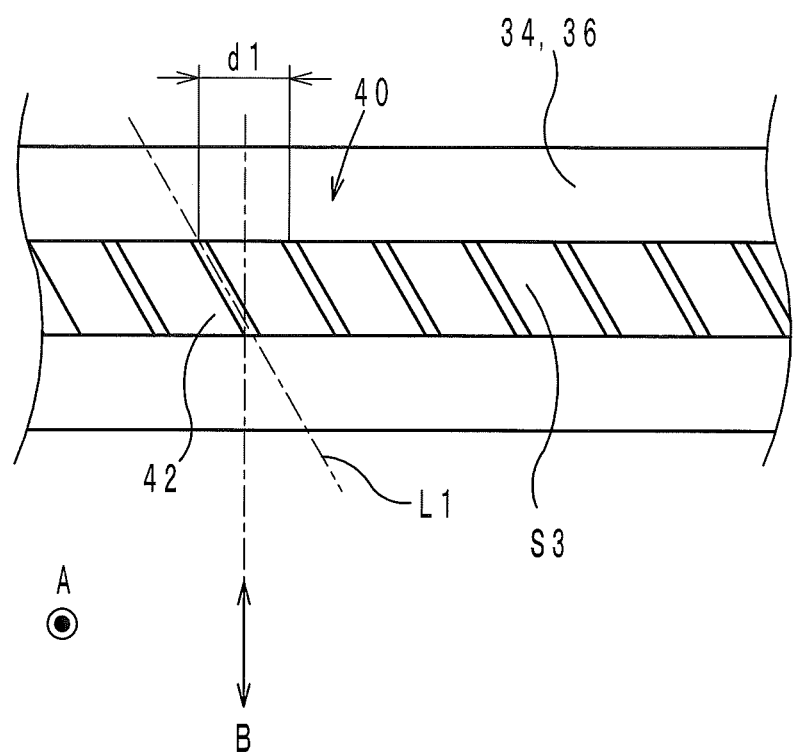
FIG. 5 is a plan view of the light guide when viewed from a direction orthogonal to a reflecting surface.

As indicated in FIG. 5, when viewed from a direction (first direction) A orthogonal to the reflecting surface S3, the asperities 42 are parallel to straight lines L1 inclined from a direction (second direction) B orthogonal to the extending direction of the light guide 34.

Figure 6:
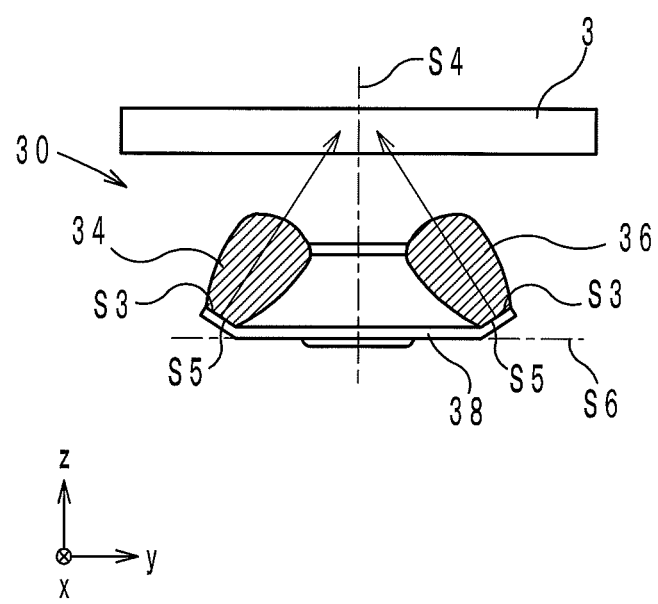
FIG. 6 is a sectional view of the light source device and a document glass along the line T-T indicated in FIG. 3.

The light guide 36 is made of the same material as the light guide 34. As seen in FIG. 6, when viewed from the x-direction, the light guide 36 is arranged to be symmetrical with the light guide 34 with respect to a plane S4 parallel to the x-direction and the z-direction and passing the center of the light guiding device 30. The light guide 36 has the same function as the light guide 34, and a detailed description of the light guide 36 is omitted.

The base 38 extends in the x-direction along the light guides 34 and 36 and supports the light guides 34 and 36 from the negative z-direction. For adjustment of the light emitting direction from each of the light guides 34 and 36 toward the document D, supporting surfaces S5 of the base 38 that directly support the light guides 34 and 36 are inclined from a surface S6 parallel to the x-direction and the y-direction.

Effects

Figure 7:
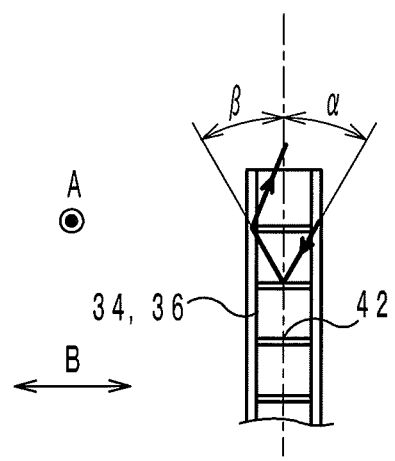
FIG. 7 is a plan view of a light guide according to a comparative example when viewed from a direction orthogonal to a reflecting surface.
Figure 8:
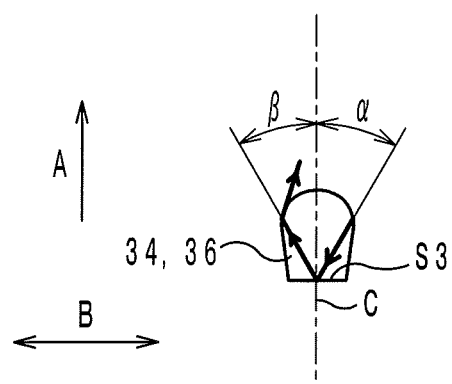
FIG. 8 is a plan view of the light guide according to the comparative example when viewed from a direction parallel to the reflecting surface.

With respect to the image reading apparatus 1 having the structure above, in each of the light guides 34 and 36, the asperities 42 forming the prism 40 are parallel to the straight lines L1 inclined from the direction (second direction) B orthogonal to the extending direction of the light guides 34 and 35, when viewed from the direction (first direction) A orthogonal to the reflecting surface S3. In each of the light guides 34 and 36 having the structure above, the light reflecting area of the inclined asperities 42 of the prism 40 is great, and accordingly, the amount of reflected light is great, compared with a case as illustrated in FIG. 7 where the asperities 42 of the prism 40 in each of the light guides 34 and 36 are parallel to the direction B when viewed from the direction A. Thus, in the light guides 34 and 36, the light use efficiency can be improved. Accordingly, in the light guides 34 and 36 having the structure above, it is no longer necessary to shorten the intervals dl between the asperities 42 (see FIG. 5), that is, to make the pitch of the prism denser, so as to achieve higher light use efficiency. Therefore, in the light guides 34 and 36, the pitch of the prism, which is a factor of the light distribution, does not need to be changed. Thus, the light guides 34 and 36 can achieve improved light use efficiency while maintaining good light distribution.

Figure 9:
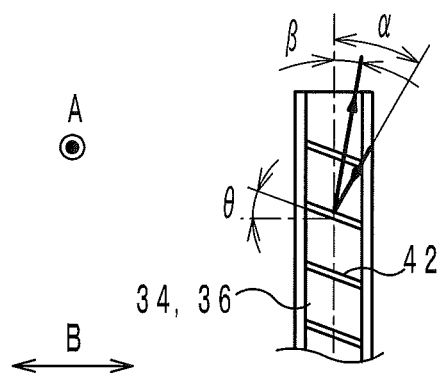
FIG. 9 is a plan view of the light guide according to the embodiment of the present invention when viewed from the direction orthogonal to the reflecting surface.
Figure 10:
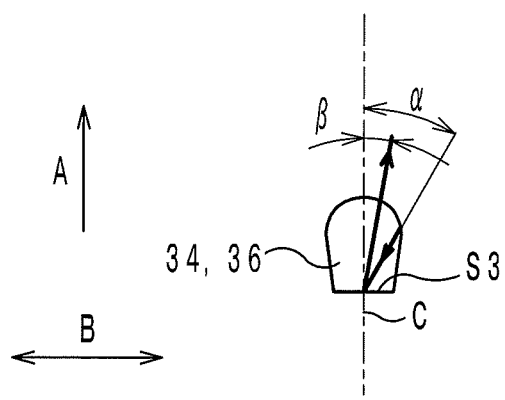
FIG. 10 is a plan view of the light guide according to the embodiment of the present invention when viewed from a direction parallel to the reflecting surface.

Further, it is possible to adjust the light emitting direction from each of the light guides 34 and 36. Specifically, in a case as illustrated in FIG. 7 where the asperities 42 forming the prism 40 of each of the light guides 34 and 36 are parallel to the direction B when viewed from the direction A, the angle α of an incident light beam to a plane C parallel to the extending direction of the light guide 34 or 36 and orthogonal to the reflecting surface S3 is equal to the angle β of a reflected light beam to the plane C. According to this embodiment, however, since each of the asperities 42 forming the prism 40 in each of the light guides 34 and 36 is inclined from the direction B by an angle θ when viewed from the direction A (see FIG. 9), the angle α and the angle β are not equal to each other, and the angles α and β are in relation of β=2θ−α. By using this relation, the light emitting direction from each of the light guides 34 and 36 can be adjusted.

By adopting the way of adjusting the light emitting direction from each of the light guides 34 and 36, it is no longer necessary to tilt the supporting surfaces S5, which directly support the light guides 34 and 36, of the base 38. Accordingly, by using the light guides 34 and 36 having the structure above, it is possible to form the base 38 into a shape as illustrated in FIG. 11 such that the supporting surfaces S5 directly supporting the light guides 34 and 36 are located on the same level with the surface S6 parallel to the x-direction and the y-direction. That is, the supporting surfaces S5 can be arranged parallel to the document mount surface of the image reading apparatus 1. Consequently, the shape of the base 38 can be simplified.

First Modification; See FIGS. 7-12

An image reading apparatus 1A according to a first modification is different from the image reading apparatus 1 in that the asperities 42 forming the prism 40 in each of the light guides 34 and 36 are parallel to arc-like curves L2 when viewed from the direction A (see FIG. 12). In each of the light beams 34 and 36 of the image reading apparatus 1A, the light-reflecting area of the asperities 42 of the prism 40 is great, and accordingly, the amount of reflected light is great, compared with a case as illustrated in FIG. 7 where the asperities 42 in each of the light guides 34 and 36 are parallel to the direction B when viewed from the direction A. Accordingly, in the light guides 34 and 36 having the structure above, it is no longer necessary to shorten the intervals dl between the asperities 42 (see FIG. 5), that is, to make the pitch of the prism denser, so as to achieve higher light use efficiency. Therefore, in the light guides 34 and 36, the pitch of the prism, which is a factor of the light distribution, does not need to be changed. Thus, the light guides 34 and 36 can achieve improved light use efficiency while maintaining good light distribution.

According to the first modification, it is possible to adjust the light emitting direction from each of the light guides 34 and 36 by adjusting the curvatures of the curves L2.

There is no other structural difference between the image reading apparatus 1 and the image reading apparatus 1A. Therefore, the image reading apparatus 1A is as described above in connection with the image reading apparatus 1 except for the point that the asperities 42 forming the prisms 40 are parallel to the ark-like curves L2 when viewed from the direction A as illustrated in FIG. 12.

Second Modification; See FIGS. 13-16

Figure 13:
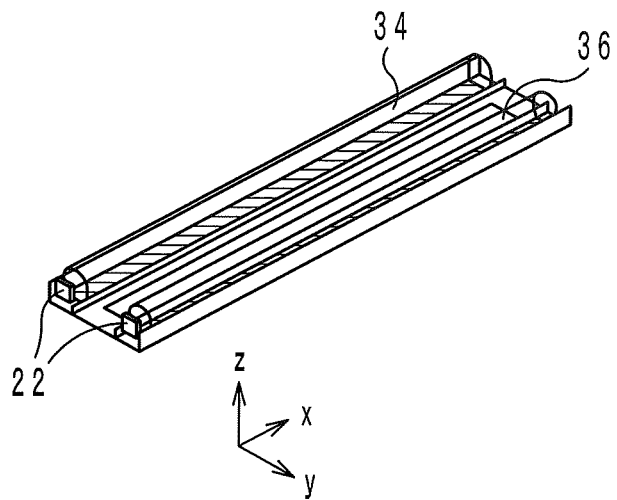
FIG. 13 is a perspective view of a light source device according to a second modification.

An image reading apparatus 1B according to a second modification is different from the image reading apparatus 1 in the following points: there are provided LED light sources 22 respectively for the light guides 34 and 36; and in each of the light guides 34 and 36, the asperities 42 forming the prism 40 are parallel to straight lines L1 varying in angle θ to the direction B depending on the distance from the LED light source 22. Specifically, in the image reading apparatus 1B, as illustrated in FIG. 13, the LED light sources 22 are provided respectively at the ends of the light guides 34 and 36 in the negative x-direction. Thus, the image reading apparatus 1B comprises two LED light sources 22 instead of having the beam splitter 32. Also, in each of the light guides 34 and 36, the angle θ of the line L1 parallel to one of the asperities 42 (a first asperity) near the LED light source 22 to the direction B is greater than the angle θ of the line L1 parallel to another of the asperities 42 (a second asperity) far from the LED light source 22 to the direction B. In other words, in each of the light guides 34 and 36 of the image reading apparatus 1B, the closer to the LED light source 22 the asperity 42 is located, the greater the angle θ of the line L1 parallel to the asperity 42 to the direction B is, and the farther from the LED light source 22 the asperity 42 is located, the smaller the angle θ of the line L1 parallel to the asperity 42 to the direction B is.

In the image reading apparatus 1B, each of the light guides 34 and 36 can achieve good light distribution from the end near the light sources 22 through to the end far from the light sources 22. Specifically, in the vicinity of the LED light sources 22, the light is highly directive, and as is apparent from the light distribution Q in the y-direction illustrated in FIG. 15, the light is likely to concentrate on certain parts of the image reading area. Accordingly, if, in each of the light guides 34 and 36, the angle θ of the line L1 parallel to one of the asperities 42 near the LED light source 22 to the direction B is equal to the angle θ of the line L1 parallel to another of the asperities 42 far from the LED light source 22 to the direction B, in the vicinity of the LED light source 22, the light is likely to concentrate excessively on certain parts of the image reading area.

Figure 14:
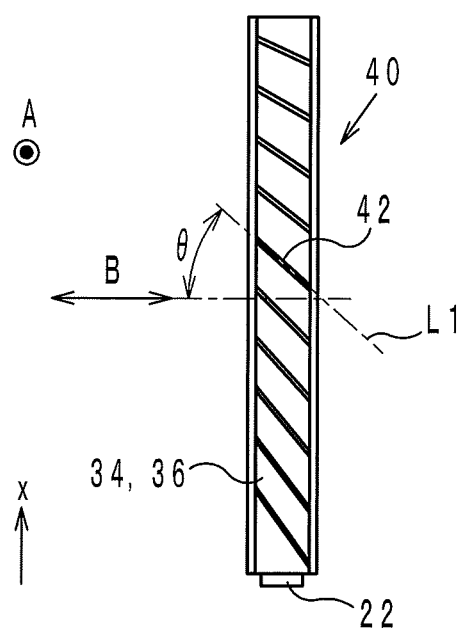
FIG. 14 is a plan view of a light guide according to the second modification when viewed from a direction orthogonal to a reflecting surface.
Figure 15:
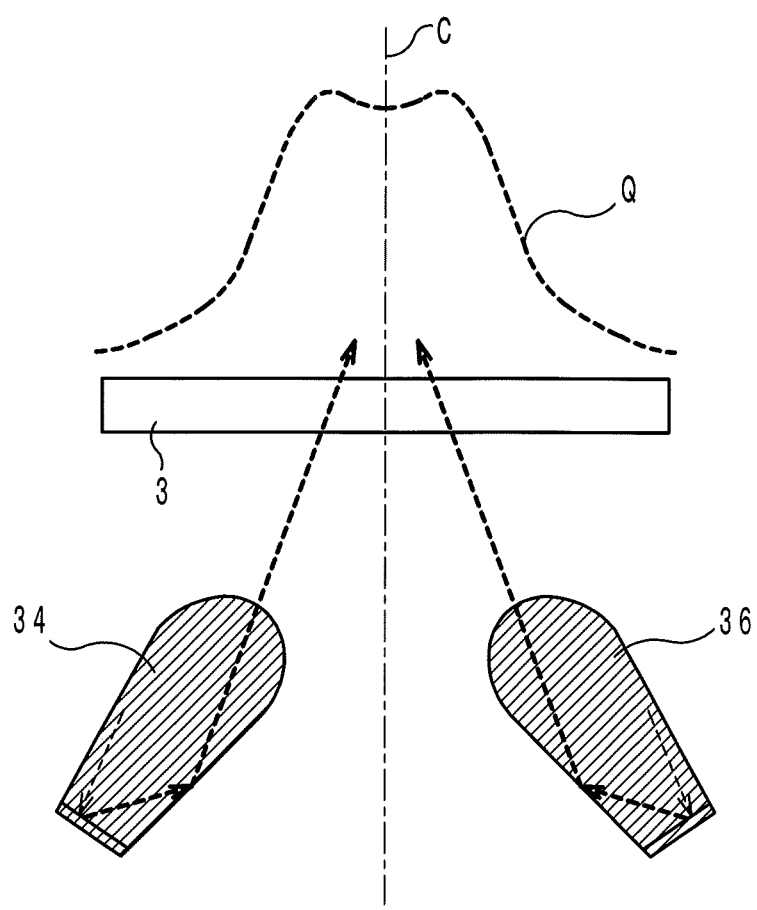
FIG. 15 is a diagram explaining light distribution in a sub-scanning direction achieved by a light guiding device according to a comparative example.

In each of the light guides 34 and 36 of the image reading apparatus 1B, as illustrated in FIG. 14, the closer to the LED light source 22 the asperity 42 is located, the greater the angle θ of the line L1 parallel to the asperity 42 to the direction B is, and the farther from the LED light source 22 the asperity 42 is located, the smaller the angle θ of the line L1 parallel to the asperity 42 to the direction B is. With the light guides 34 and 36 in the image reading apparatus 1B, the light concentration on certain parts of the image reading area can be inhibited, and good light distribution can be achieved even in the vicinity of the LED light sources 22.

There is no other structural difference between the image reading apparatus 1 and the image reading apparatus 1B. Therefore, the image reading apparatus 1B is as described above in connection with the image reading apparatus 1 except for the point that LED light sources 22 are provided respectively for the light guides 34 and 36 and the point that, in each of the light guides 34 and 36, the asperities 42 forming the prism 40 are parallel to the straight lines L1 varying in angle θ to the direction B depending on the distance from the LED light source 22.

Third Modification; See FIGS. 15-17

An image reading apparatus 1C according to a third modification is different from the image reading apparatus 1 in the following points: there are provided LED light sources 22 respectively for the light guides 34 and 36; and in each of the light guides 34 and 36, the asperities 42 forming the prism 40 are parallel to arc-like curves L2 when viewed from the direction A, the curves L2 varying in curvature depending on the distance from the LED light source 22. Specifically, the LED light sources 22 are provided respectively at the ends of the light guides 34 and 36 in the negative x-direction. That is, the image reading apparatus 1C comprises two LED light sources 22 instead of having the beam splitter 32. Also, in each of the light guides 34 and 36, the curvature of the curve L2 parallel to one of the asperities 42 (a third asperity) near the LED light source 22 is greater than the curvature of the curve L2 parallel to another of the asperities 42 (a fourth asperity) far from the LED light source 22. In other words, in each of the light guides 34 and 36 of the image reading apparatus 1C, the closer to the LED light source 22 the asperity 42 is located, the greater the curvature of the curve L2 parallel to the asperity 42 is, and the farther from the LED light source 22 the asperity 42 is located, the smaller the curvature of the curve L2 parallel to the asperity 42 is.

In the image reading apparatus 1C, each of the light guides 34 and 36 can achieve good light distribution from the end near the light sources 22 through to the end far from the light sources 22. Specifically, in the vicinity of the LED light sources 22, the light is highly directive, and as is apparent from the light distribution Q in the y-direction illustrated in FIG. 15, the light is likely to concentrate on certain parts of the image reading area. Accordingly, if, in each of the light guides 34 and 36, the curvature of the curve L2 parallel to one of the asperities 42 near the LED light source 22 is equal to the curvature of the curve L2 parallel to another of the asperities 42 far from the LED light source 22, in the vicinity of the LED light sources 22, the light is likely to concentrate excessively on certain parts of the image reading area.

Figure 16:
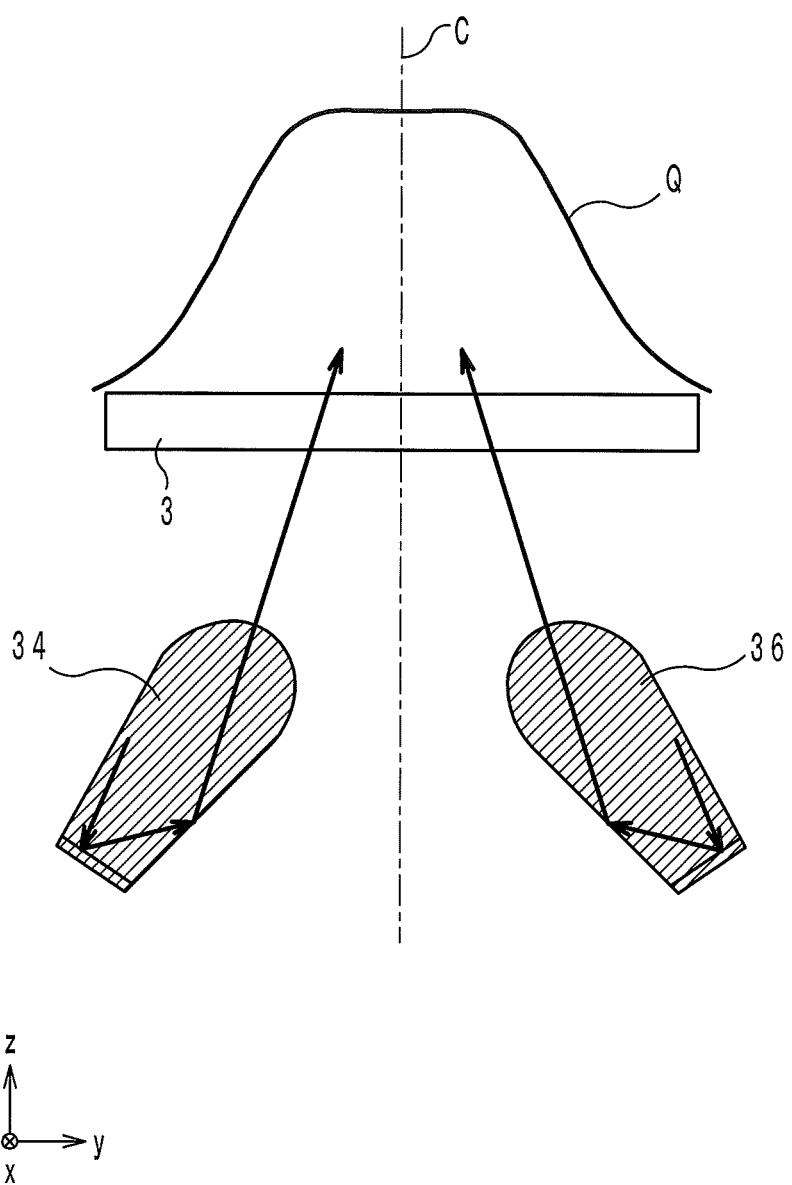
FIG. 16 is a diagram explaining light distribution in a sub-scanning direction achieved by light guiding devices according to the second modification, and a third, a fourth, a fifth, a sixth and a seventh modification.
Figure 17:
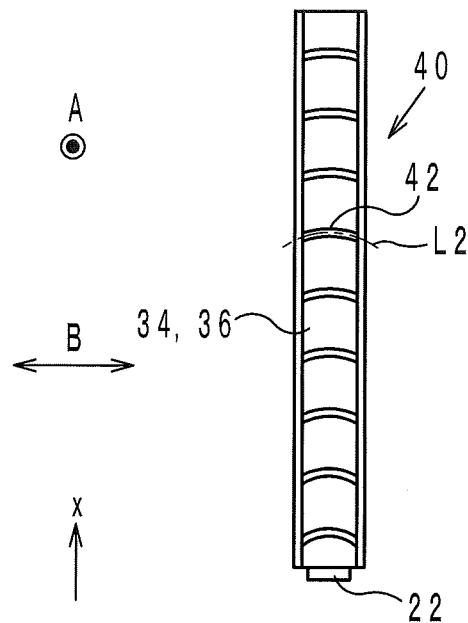
FIG. 17 is a plan view of a light guide according to a third modification when viewed from a direction orthogonal to a reflecting surface.

In each of the light guides 34 and 36 of the image reading apparatus 1C, the closer to the LED light source 22 the asperity 42 is located, the greater the curvature of the curve L2 parallel to the asperity 42 is, and the farther from the LED light source 22 the asperity 42 is located, the smaller the curvature of the curve L2 parallel to the asperity 42 is. With the light guides 34 and 36 in the image reading apparatus 1C, the light concentration on certain parts of the image reading area can be inhibited, and good light distribution can be achieved even in the vicinity of the LED light sources 22 as illustrated in FIG. 16.

There is no other structural difference between the image reading apparatus 1 and the image reading apparatus 1C. Therefore, the image reading apparatus 1C is as described above in connection with the image reading apparatus 1 except for the point that LED light sources 22 are provided respectively for the light guides 34 and 36 and the point that, in each of the light guides 34 and 36, the asperities 42 forming the prism 42 are parallel to the ark-like curves L2 varying in curvature depending on the distance from the LED light source 22.

Fourth Modification; See FIG. 18

Figure 18:
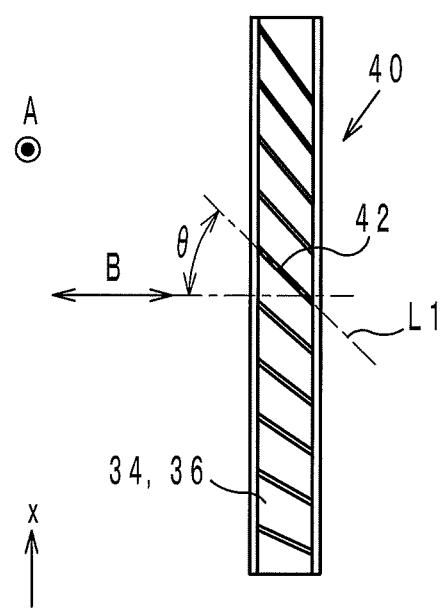
FIG. 18 is a plan view of a light guide according to a fourth modification when viewed from a direction orthogonal to a reflecting surface.

An image reading apparatus 1D according to a fourth modification is different from the image reading apparatus 1 in that, in each of the light guides 34 and 36, the asperities 42 forming the prism 40 are parallel to straight lines L1 varying in angle θ to the direction B depending on the distance from the LED light source 22. Specifically, in the image reading apparatus 1D, as illustrated in FIG. 18, the angle θ of the line L1 parallel to one of the asperities 42 (a first asperity) near the LED light source 22 to the direction B is smaller than the angle θ of the line L1 parallel to another of the asperities 42 (a second asperity) far from the LED light source 22 to the direction B. In other words, in each of the light guides 34 and 36 of the image reading apparatus 1D, the closer to the LED light source 22 the asperity 42 is located, the smaller the angle θ of the line L1 parallel to the asperity 42 to the direction B is, and the farther from the LED light source 22 the asperity 42 is located, the greater the angle θ of the line L1 parallel to the asperity 42 to the direction B is.

In the image reading apparatus 1D, each of the light guides 34 and 36 can achieve good light distribution from the end near the light source 22 through to the end far from the light source 22. Specifically, in a case where the beam splitter 32 is provided between the LED light source 22 and the light guides 34 and 36, in the vicinity of the LED light source 22, the light distribution in the y-direction is likely to be off from the center of the image reading area. Accordingly, if, in each of the light guides 34 and 36, the angle θ of the line L1 parallel to one of the asperities 42 near the LED light source 22 to the direction B is equal to the angle θ of the line L1 parallel to another of the asperities 42 far from the LED light source 22 to the direction B, in the vicinity of the LED light source 22, the light distribution in the y-direction is likely to be off from the center of the image reading area. In each of the light guides 34 and 36 of the image reading apparatus 1D, the closer to the LED light source 22 the asperity 42 is located, the smaller the angle θ of the line L1 parallel to the asperity 42 to the direction B is, and the farther from the LED light source 22 the asperity 42 is located, the greater the angle θ of the line L1 parallel to the asperity 42 to the direction B is. Thereby, with the light guides 34 and 36 in the image reading apparatus 1D, the light distribution in the y-direction in the vicinity of the light source 22 can be inhibited from getting off from the center of the image reading area, and good light distribution can be achieved even in the vicinity of the LED light source 22.

There is no other structural difference between the image reading apparatus 1 and the image reading apparatus 1D. Therefore, the image reading apparatus 1D is as described above in connection with the image reading apparatus 1 except for the point that, in each of the light guides 34 and 36, the asperities 42 forming the prism 40 are parallel to the straight lines L1 varying in angle θ to the direction B depending on the distance from the LED light source 22.

Fifth Modification; See FIG. 19

An image reading apparatus 1E according to a fifth modification is different from the image reading apparatus 1 in that, in each of the light guides 34 and 36, the asperities 42 forming the prism 40 are parallel to arc-like curves L2 varying in curvature depending on the distance from the LED light source 22. Specifically, in each of the light guides 34 and 36, the curvature of the curve L2 parallel to one of the asperities 42 (a third asperity) near the LED light source 22 is smaller than the curvature of the curve L2 parallel to another of the asperities 42 (a fourth asperity) far from the LED light source 22. In other words, in each of the light guides 34 and 36 of the image reading apparatus 1E, the closer to the LED light source 22 the asperity 42 is located, the smaller the curvature of the curve L2 parallel to the asperity 42 is, and the farther from the LED light source 22 the asperity 42 is located, the smaller the curvature of the curve L2 parallel to the asperity 42 is.

In the image reading apparatus 1E, each of the light guides 34 and 36 can achieve good light distribution from the end near the light source 22 through to the end far from the light source 22. Specifically, in a case where the beam splitter 32 is provided between the LED light source 22 and the light guides 34 and 36, in the vicinity of the LED light source 22, the light distribution in the y-direction is likely to be off from the center of the image reading area. Accordingly, when, in each of the light guides 34 and 36, the curvature of the curve L2 parallel to one of the asperities 42 near the LED light source 22 is equal to the curvature of the curve L2 parallel to another of the asperities 42 far from the LED light source 22, in the vicinity of the LED light source 22, the light distribution in the y-direction is likely to be off from the center of the image reading area. In each of the light guides 34 and 36 of the image reading apparatus 1E, the closer to the LED light source 22 the asperity 42 is located, the smaller the curvature of the curve L2 parallel to the asperity 42 is, and the farther from the LED light source 22 the asperity 42 is located, the greater the curvature of the curve L2 parallel to the asperity 42 is. With the light guides 34 and 36 in the image reading apparatus 1E, the light distribution in the y-direction in the vicinity of the light source 22 can be inhibited from getting off from the center of the image reading area, and good light distribution can be achieved even in the vicinity of the LED light source 22.

There is no other structural difference between the image reading apparatus 1 and the image reading apparatus 1E. Therefore, the image reading apparatus 1E is as described above in connection with the image reading apparatus 1 except for the point that, in each of the light guides 34 and 36, the asperities 42 forming the prism 40 are parallel to the curves L2 varying in curvature depending on the distance from the LED light source 22.

Sixth Modification; See FIG. 20

Figure 20:
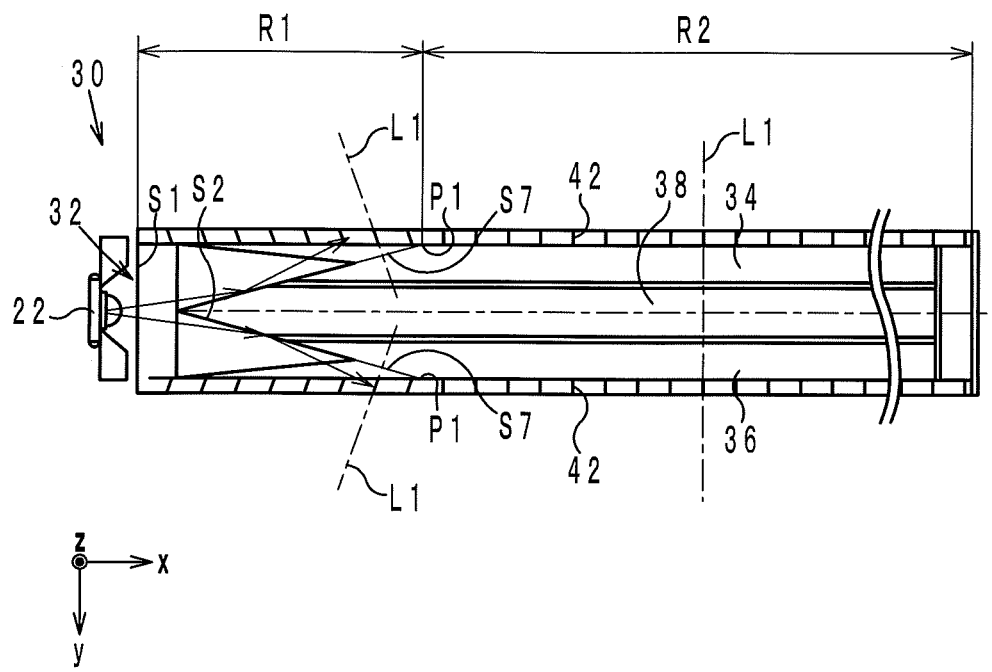
FIG. 20 is a plan view of a light source device according to a sixth modification when viewed from a direction orthogonal to a mount surface of a document glass.

An image reading apparatus 1F according to a sixth modification is different from the image reading apparatus 1 in that, in each of the light guides 34 and 36, some of the asperities 42 forming the prism 40 located in an area are parallel to a straight line L1 extending in a direction, while the other asperities 42 in the other area are parallel to a straight line L1 extending in another direction, the areas being divided at a specified point. The arrangement of the asperities 42 in an area R1 closer to the LED light source 22 and the arrangement of the asperities 42 in an area R2 farther from the LED light source 22 are as illustrated in FIG. 20. Specifically, in each of the light guides 34 and 36, the areas R1 and R2 are divided at a point P1 that is the point closest to the beam splitter 32 on a line of intersection between a plane S7 on which the splitting surface S2 is located and the reflecting surface S3. In the area R1 closer to the LED light source 22, the line L1 parallel to the asperities 42 is substantially orthogonal to the splitting surface S2 of the beam splitter 32, and in the area R2 farther from the LED light source 22, the line L1 parallel to the asperities 42 is substantially parallel to the direction B.

In the image reading apparatus 1F, in the vicinity of the beam splitter 32, a light beam traveling substantially parallel to the splitting surface S2 of the beam splitter 32 enters each of the light guides 34 and 36 substantially at a right angle to the asperities 42. Consequently, in the image reading apparatus 1F, the light guides 34 and 36 can achieve better light use efficiency, compared with the light guides 34 and 36 in the image reading apparatus 1.

There is no other structural difference between the image reading apparatus 1 and the image reading apparatus 1F. Therefore, the image reading apparatus 1F is as described above in connection with the image reading apparatus 1 except for the point that, in each of the light guides 34 and 36, some of the asperities 42 located in an area are parallel to a straight line L1 extending in a direction, while the other asperities 42 in the other area are parallel to a straight line L1 extending in another direction.

Seventh Modification; See FIG. 21

Figure 21:
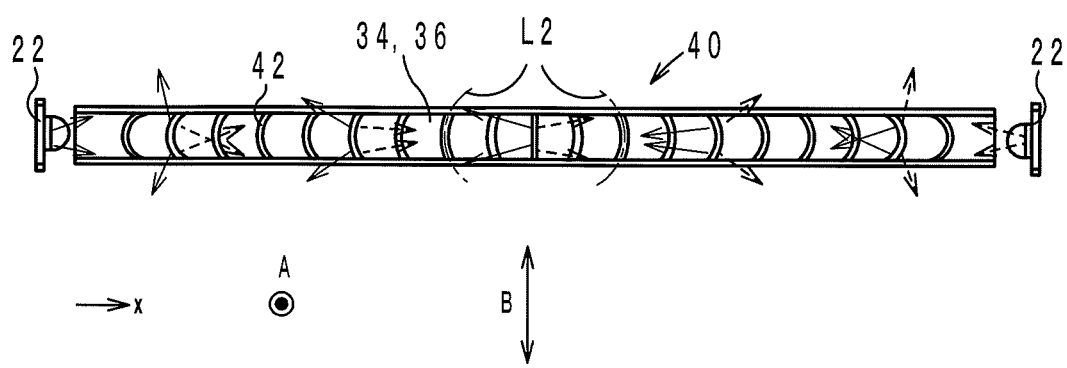
FIG. 21 is a plan view of a light guide according to a seventh modification when viewed from a direction orthogonal to a reflecting surface.

An image reading apparatus 1G according to a seventh modification is different from the image reading apparatus 1 in the shapes of the asperities 42 forming the prism 40 in each of the light guides 34 and 36 and in that LED light sources 22 are provided respectively at both ends of each of the light guides 34 and 36. In the image reading apparatus 1G, as illustrated in FIG. 21, in each of the light guides 34 and 36, the asperities 42 forming the prism 40 are parallel to ark-like curves L2 each having a center of curvature on a point toward the center of the light guide 34 or 36 when viewed from the direction A. In each of the light guides 34 and 36 in the image reading apparatus G, further, the farther from the center of the light guide 34 or 36 the asperity 42 is located, the greater the curvature of the curve L2 parallel to the asperity 42 is. In other words, in each of the light guides 34 and 36, the curvature of the curve L2 parallel to one of the asperities 42 close to the center of the light guide 34 or 36 with respect to the x-direction is smaller than the curvature of the curve L2 parallel to another of the asperities 42 farther from the center of the light guide 34 or 36. The curvature of the curve L2 parallel to the asperity 42 in the center of each of the light guides 34 and 36 is substantially zero. In other words, the curve L2 parallel to the asperity 42 in the center of each of the light guides 34 and 36 is substantially straight. Also, in the image reading apparatus 1G, LED light sources 22 are provided at the both ends of each of the light guides 34 and 36 in the positive and negative x-directions. In sum, four LED light sources are provided in the image reading apparatus 1G.

In the image reading apparatus 1G having the structure above, chromatic variation in each of the light guides 34 and 36 that is possibly caused by the provision of the LED light sources 22 at the both ends of each of the light guides 34 and 36 in the positive and negative x-directions can be inhibited. More specifically, in a structure as the image reading apparatus 1G where LED light sources are provided at the both ends of each of the light guides 34 and 36, generally, each of the light guides 34 and 36 has chromatic variation between the side portion in the positive x-direction and the side portion in the negative x-direction because the LEDs vary in chromaticity. For example, in a case where the light emitted from the LED light source provided at the end in the negative x-direction is bluish and where the light emitted from the LED light source provided at the end in the positive x-direction is reddish, the light outgoing from the portion of the light guide 34 or 36 near the LED light source provided at the end in negative x-direction is bluish, and the light outgoing from the portion of the light guide 34 or 36 near the LED light source provided at the end in positive x-direction is reddish. In the image reading apparatus 1G, with the prisms 40 structured above, in the portion of each of the light guides 34 and 36 on the negative x-direction side from the center thereof, the asperities 42 diffuse light traveling from the negative x-direction and converges light traveling from the positive x-direction on an exposed point on the document D. Also, in the portion of each of the light guides 34 and 36 on the positive x-direction side from the center thereof, the asperities 42 diffuse light traveling from the positive x-direction and converges light traveling from the negative x-direction on the exposed point on the document D. Thus, in the image reading apparatus 1G, the risk that chromatic variation occurs due to the provision of the LED light sources 22 at the both sides of each of the light guides 34 and 36 can be diminished.

Other Embodiments; See FIGS. 22 through 24

Light guides, light guiding devices and image reading apparatuses according to the present invention are not limited to the embodiment and the modifications described above. For example, as illustrated in FIG. 22, the asperities 42 forming the prism 40 in each of the light guides 34 and 36 may be arranged to form crosses when viewed from the direction A. Each of the asperities 42 may be V-shaped when viewed from the direction A as illustrated in FIG. 23. Each of the asperities 42 may be in the shape of a combination of straight lines and curves as illustrated in FIG. 24. The above-described image reading apparatus 1 is according to an embodiment of using two light guides. However, it is possible to use only one light guide instead of using two light guides, and in this case, one mirror is used to reflect the light output from the light guide. The structures of the image reading apparatuses 1 and 1A through 1G may be combined.

Although the present invention has been described in connection with the preferred embodiments above, it is to be noted that various changes and modifications may be apparent to those who are skilled in the art. Such changes and modifications are to be understood as being within the scope of the invention.

What is claimed is:

1. A light guide for use in an image reading apparatus, the light guide extending in a predetermined direction and comprising:
    a reflecting surface being parallel to the predetermined direction;
    an emitting surface; and
    a prism configured to reflect light to the emitting surface, the prism including a plurality of asperities formed on the reflecting surface;
    wherein when the light guide is viewed from a first direction orthogonal to the reflecting surface, at least one of the plurality of asperities includes a portion parallel to a predetermined curve;
    when the light guide is viewed from the first direction orthogonal to the reflecting surface, the plurality of asperities include portions parallel to predetermined curves; and
    when the light guide is viewed from the first direction, the predetermined curves vary gradually in curvature as a distance from an end of the light guide in the predetermined direction increases and the distance from another end of the light guide in the predetermined direction decreases;
    when the light guide is viewed from the first direction, each of the predetermined curves is an arc having a center of curvature on a point toward a center of the light guide; and
    a curvature of the predetermined curve for a third asperity of the plurality of asperities is smaller than the curvature of the predetermined curve for a fourth asperity of the plurality of the asperities, the fourth asperity being adjacent to the third asperity and being farther from the center of the light guide than the third asperity.

2. A light guide comprising: a plurality of light guides according to claim 1; and
    a beam splitter having a splitting surface configured to total-reflect incident light so as to direct the light into the plurality of light guides;
    wherein when each of the light guides is viewed from the first direction, a predetermined straight line is substantially parallel to a direction orthogonal to the splitting surface.

3. An image reading apparatus comprising: a light source device including the light guiding device according to claim 2 and an LED light source.

4. A light guiding device comprising:
    a plurality of light guides according to claim 1; and
    a beam splitter having a splitting surface configured to total-reflect incident light so as to direct the light into the plurality of light guides;
    wherein when each of the light guides is viewed from the first direction, an angle of the predetermined straight line parallel to one of the asperities located in a first area to the second direction is different from an angle of the predetermined straight line parallel to another of the asperities located in a second area to the second direction, the first area and the second area bordering each other at a point closest to the beam splitter on a line of intersection between a plane on which the splitting surface is located and the reflecting surface.

5. A light guiding device comprising:
    a plurality of light guides according to claim 1; and
    a beam splitter having a splitting surface configured to total-reflect incident light so as to direct the light into the plurality of light guides;
    wherein when each of the light guides is viewed from the first direction, a curvature of the predetermined curve parallel to one of the asperities located in a third area is different from a curvature of the predetermined curve parallel to another of the asperities located in a fourth area, the third area and the fourth area bordering each other at a point closest to the beam splitter on a line of intersection between a plane on which the splitting surface is located and the reflecting surface.

6. A light guiding device comprising:
    the light guide according to claim 1; and
    a base sustaining the light guide by directly supporting an outer surface of the reflecting surface of the light guide;
    wherein the outer surface is parallel to a document mount surface of an image reading apparatus in which the light guide is to be employed.

7. An image reading apparatus comprising the light guide according to claim 1.

8. An image reading apparatus comprising: a light source device including the light guide according to claim 1 and an LED light source.

9. A light guiding device comprising:
    a plurality of light guides extending in a predetermined direction, each of the plurality of light guides comprising:
    a reflecting surface being parallel to the predetermined direction;
    an emitting surface; and
    a prism configured to reflect light to the emitting surface, the prism including a plurality of asperities formed on the reflecting surface;
    wherein when each of light guide is viewed from a first direction orthogonal to the reflecting surface, at least one of the plurality of asperities includes a portion parallel to a predetermined straight line inclined from a second direction orthogonal to the predetermined direction; and
    a beam splitter having a splitting surface configured to total-reflect incident light so as to direct the light into the plurality of light guides;
    wherein when each of the light guides is viewed from the first direction, an angle with respect to the second direction of the predetermined straight line parallel to a first asperity of the plurality of asperities to smaller than an angle with respect to the second direction of the predetermined straight line parallel to a second asperity of the plurality of asperities the second asperity being adjacent to the first asperity and being farther from a light entrance portion of the light guide than the first asperity.

10. A light guiding device comprising:
a plurality of light guides extending in a predetermined direction, each of the plurality of light guides comprising:
a reflecting surface being parallel to the predetermined direction;
an emitting surface; and
a prism configured to reflect light to the emitting surface, the prism including a plurality of asperities formed on the reflecting surface;
wherein when each of light guides is viewed from a first direction orthogonal to the reflecting surface, at least one of the plurality of asperities includes a portion parallel to a predetermined curve or a predetermined straight line inclined from a second direction orthogonal to the predetermined direction; and
a beam splitter having a splitting surface configured to total-reflect incident light so as to direct the light into the plurality of light guides;
wherein when each of the light guides is viewed from the first direction, a curvature of the predetermined curve parallel to a third asperity of the plurality of asperities is smaller than a curvature of the predetermined curve parallel to a fourth asperity of the plurality of asperities, the fourth asperity being adjacent to the third asperity and being farther from a light entrance portion of the light guide than the third asperity.

* * * * *